INVENTORS
ALAN J. FOX &
NORMAN W. W. SMITH
BY
AGENT

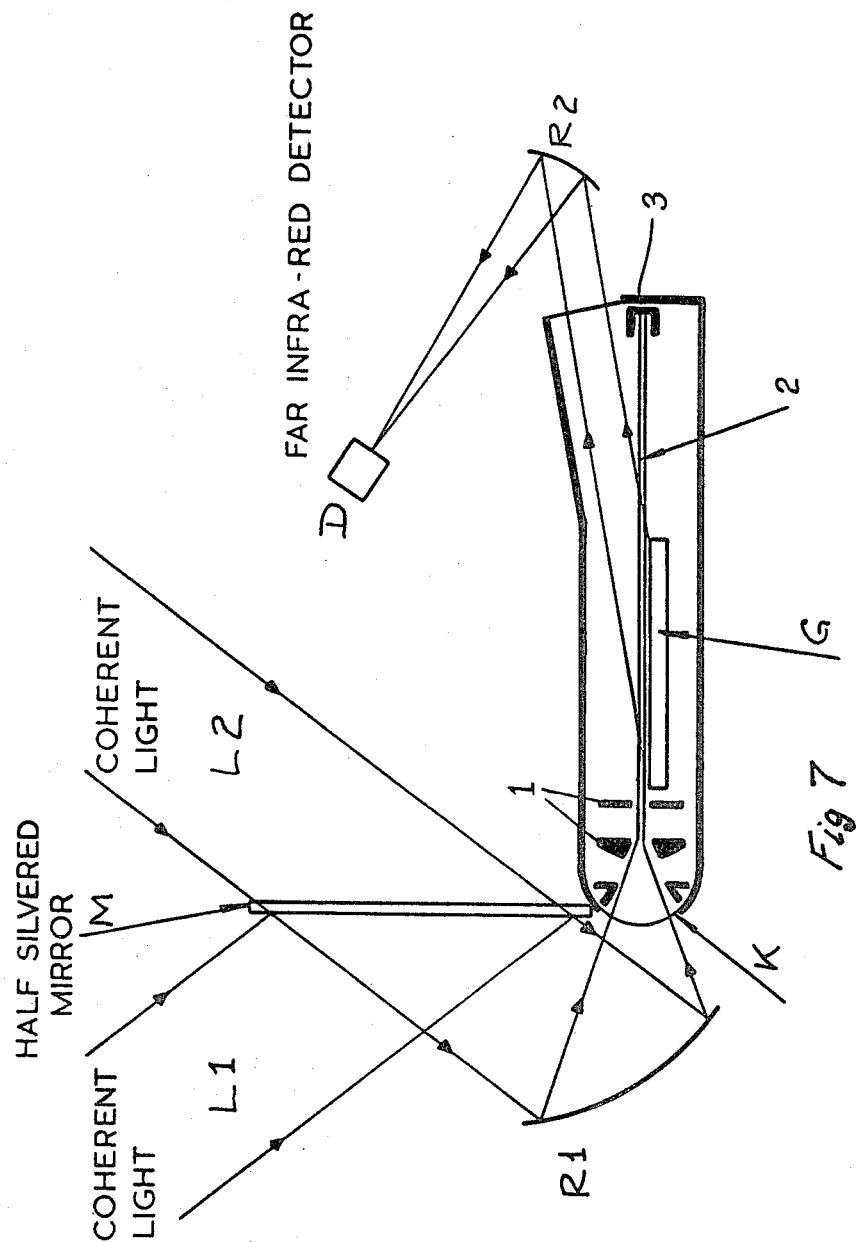

United States Patent Office 3,439,167
Patented Apr. 15, 1969

3,439,167
INFRARED RADIATION SOURCE UTILIZING TWO BEAMS OF COHERENT RADIATION AND A DISCHARGE TUBE HAVING A METALLIC GRATING THEREIN
Alan John Fox, Horley, Surrey, and Norman William White Smith, Reigate, Surrey, England, assignors to North American Philips Company, Inc., New York, N.Y., a corporation of Delaware
Filed Jan. 25, 1965, Ser. No. 427,548
Claims priority, application Great Britain, Jan. 24, 1964, 3,172/64
Int. Cl. H01j 39/12, 35/00, 37/00
U.S. Cl. 250—84                                    9 Claims

ABSTRACT OF THE DISCLOSURE

A source of infrared radiation employing an electron discharge tube having a photoemissive cathode and means to form elecerons emitted by the cathode into a laminar beam of electrons is disclosed. A metallic-grating is disposed so that the laminar beam of electrons travels along the surface thereof in a direction perpendicular to the grooves in the grating. Two coherent beams of electromagnetic radiation are applied to the cathode which produces a spatially coherent electron beam modulated at the difference frequency of the coherent beams of electromagnetic radiation. The modulated electron beam interacts with the grating producing infrared radiation which can be detected by a detector positioned at the correct viewing angle to intercept this radiation.

---

The present invention relates to a radiation source which will produce narrow-band quasi-coherent radiation in the infrared region of the spectrum.

According to one aspect of the invention a source of narrow-band quasi-coherent electromagnetic radiation comprises a vacuum tube having a photo-emissive cathode, means for forming into a flat laminar beam electrons emitted from said cathode, a metallic grating disposed so that the laminar beam of electrons travels along the surface thereof in a direction perpendicular to the grooves of the grating, means for applying to the photo-emissive cathode two coherent beams of electromagnetic radiation to produce from the cathode an electron beam modulated at the difference frequency of said coherent beams, a detector responsive to coherent electromagnetic radiation emitted at said difference frequency from the interaction of said electron beam with the grating.

According to another aspect of the invention a source of narrow-band quasi-coherent electromagnetic radiation comprises a vacuum tube, a radiation-sensitive electron-emissive cathode in said tube, means for applying to said cathode two coherent beams of electromagnetic radiation, a metallic grating in said tube, and means for forming electrons emitted from said cathode into a beam directed along the surface of said grating to cause generation of electromagnetic radiation at the difference frequency of the two coherent beams.

The invention also provides a cathode having a rear surface for receiving said beams of coherent radiation and having a front surface for emitting electrons. According to a feature of the invention the said means for applying coherent beams of radiation to the rear surface of the cathode comprise a half-silvered mirror for combining the two beams and means for focusing the combined beams onto the rear surface of the cathode. The invention also provides a radiation-sensitive electron-emissive surface on said cathode.

According to a further aspect of the invention there is provided a source of narrow-band quasi-coherent electromagnetic radiation comprising electron-emissive radiation-responsive means operative to receive two coherent beams of radiation at different frequencies, a metal grating, means for causing electrons emitted by said radiation-responsive means to travel along the surface of said grating and means to collect coherent electromagnetic radiation emitted from the surface of the grating at a frequency which is the difference between the frequencies of the two coherent beams.

Embodiments of the invention will now be described with reference to the accompanying diagrammatic drawings in which FIGURE 1 illustrates an image charge representation of the dipole radiation from a moving electron.

Figure 4:
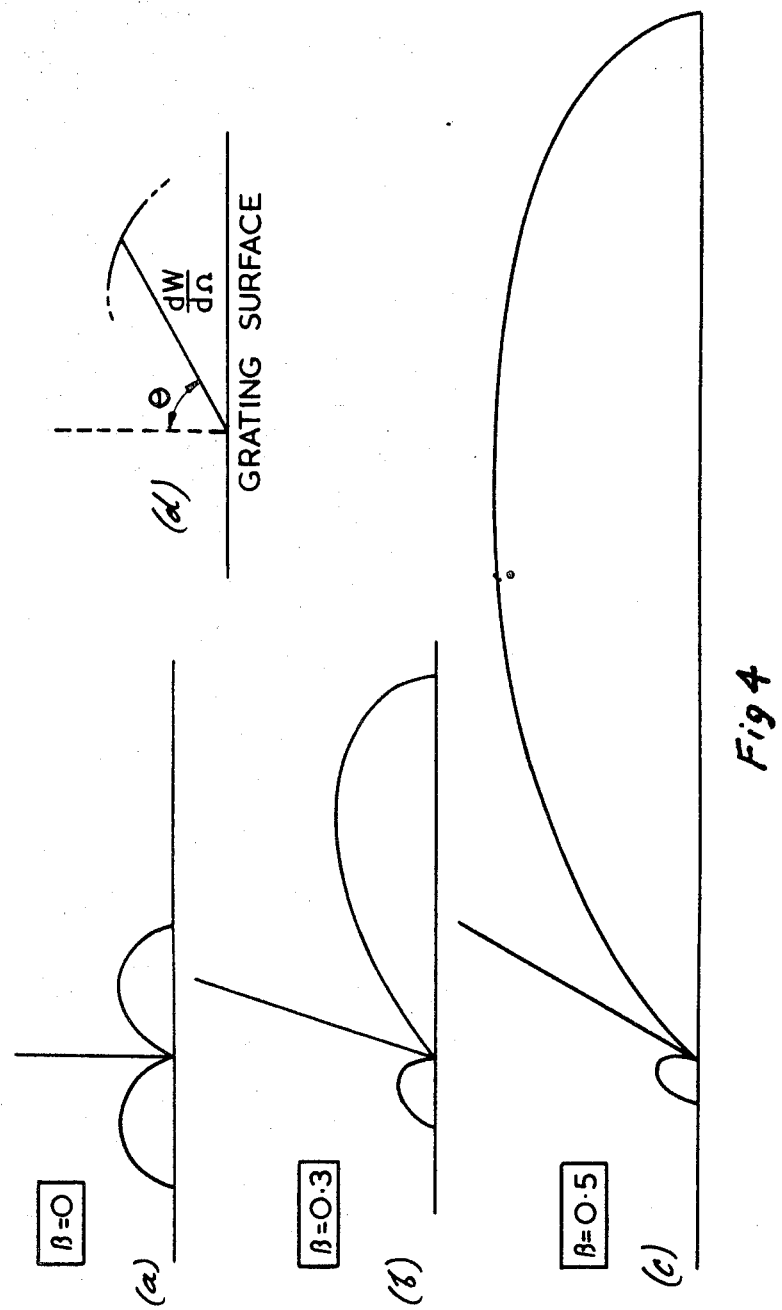

FIGURE 4a, b, c and d illustrate the lobe patterns of moving dipole radiation.

Figure 5:
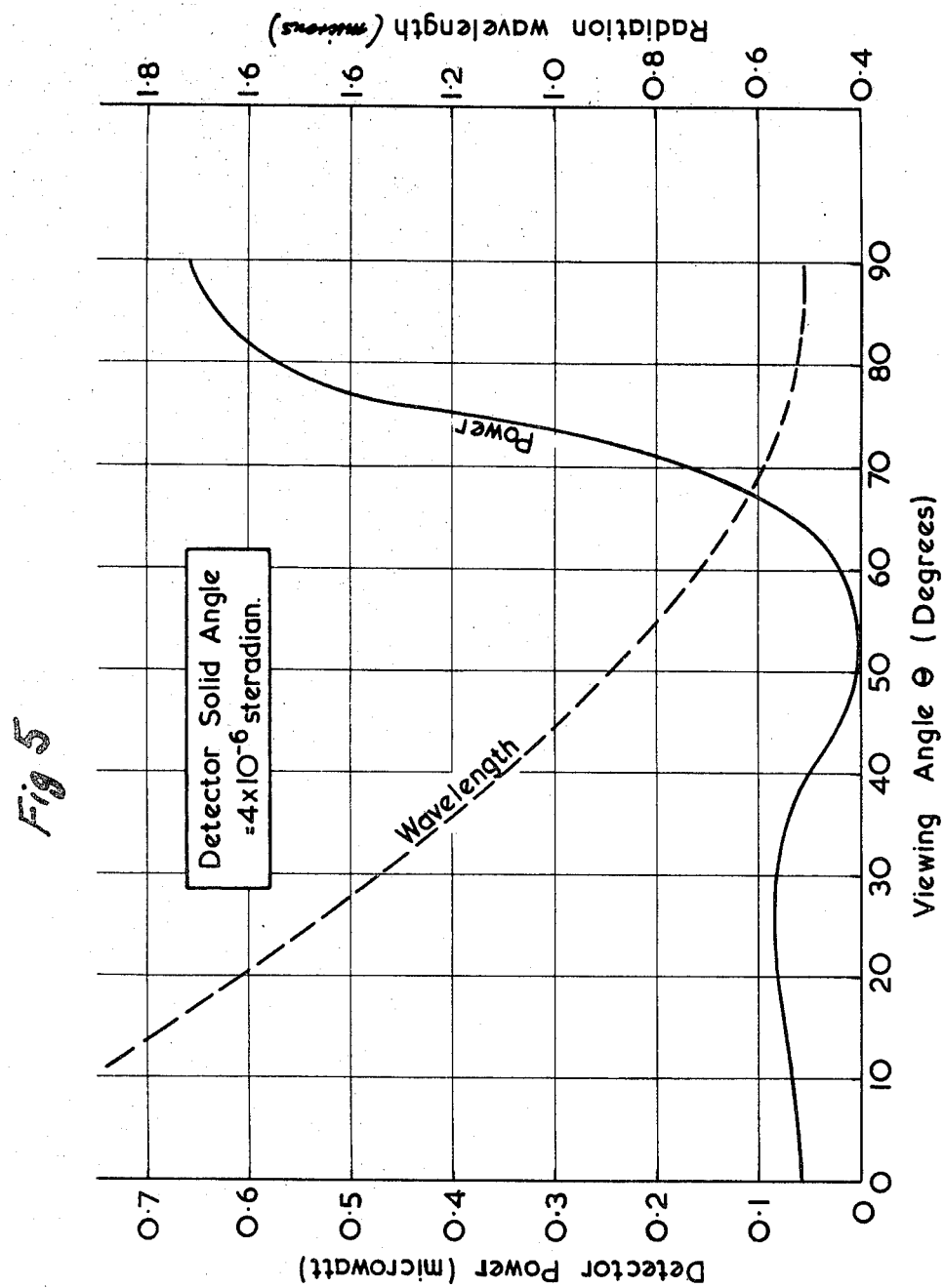

FIGURE 5 illustrates detected power for an optical radiator.

FIGURES 6a and b illustrate further lobe patterns.

FIGURE 7 illustrates a first embodiment of the invention and

Figure 8:
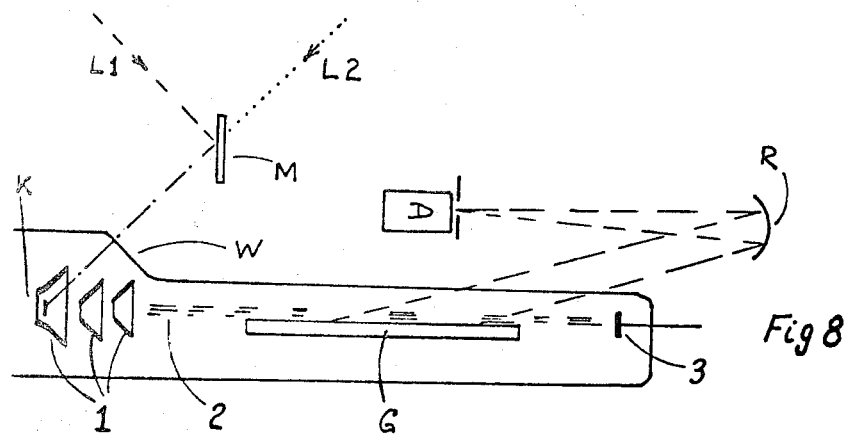
Figure 9:
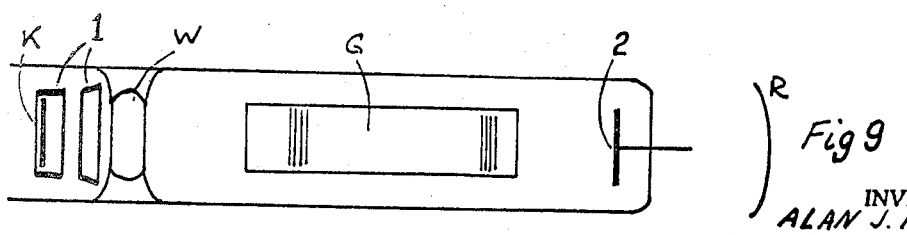

FIGURES 8 and 9 illustrate a second embodiment of the invention.

In 1953 S. J. Smith and E. M. Purcell discovered that an electron beam produced visible radiation when it was projected parallel and close to the surface of a metallic diffraction grating. The wavelength of this radiation varied with the beam velocity and the angle at which it was observed.

To explain this effect it is necessary to take account of the surface charge distribution induced upon the grating by each individual beam electron. The concept of image charges can be used to obtain qualitative explanation in terms of the radiation emitted from a moving dipole.

Figure 1:
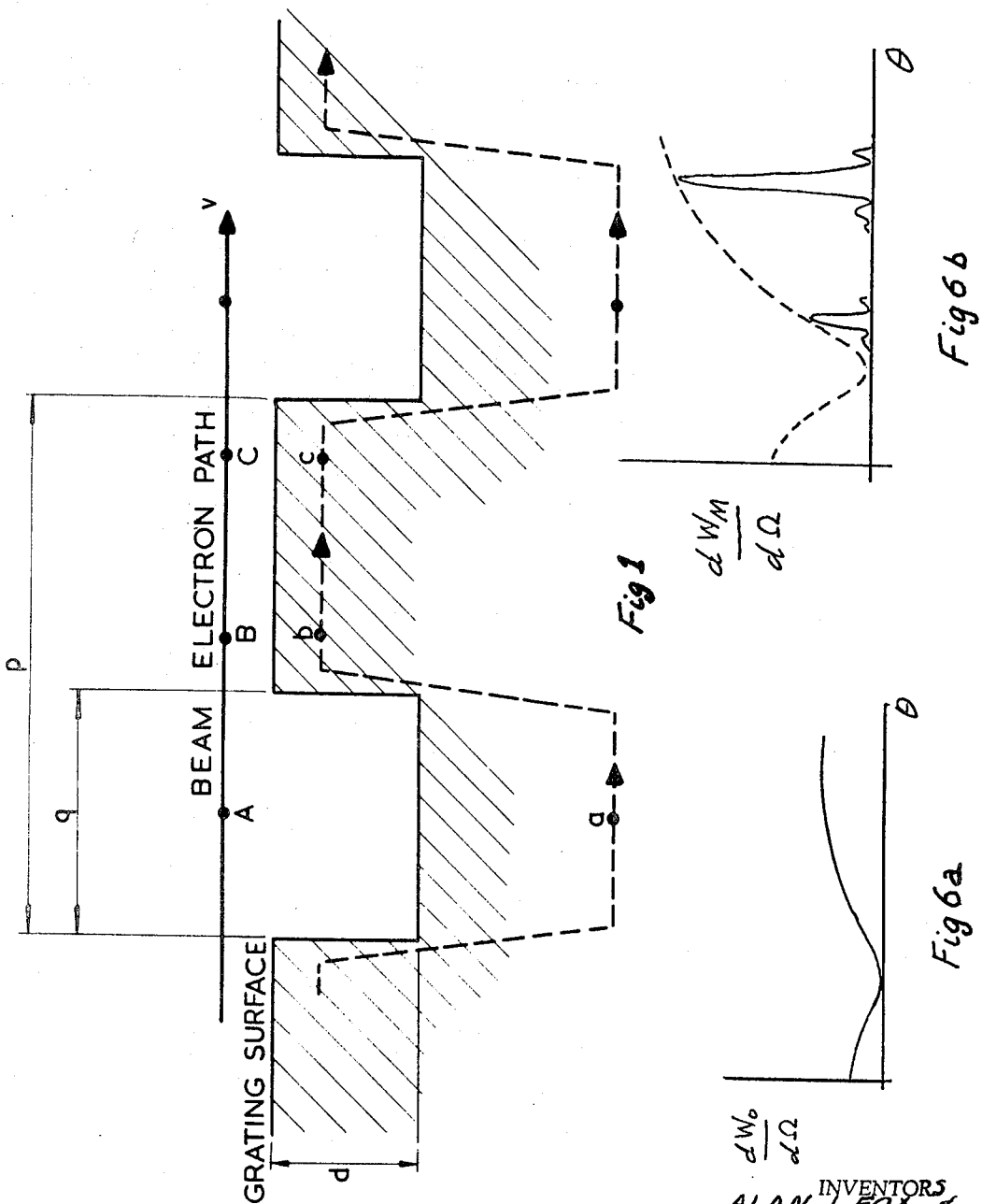

In FIGURE 1 the profile of a grating G is shown as square with a pitch $p$. The beam electron follows the straight path ABC with a velocity $v$. Meanwhile the image charge follows a path of approximately abc. The beam electron and its image charge thus form an oscillating electric dipole moving along the beam axis with a velocity $v$. The fundamental frequency of the oscillating dipole for $v<c$ (the velocity of light) is then $v/p$.

Figure 2:
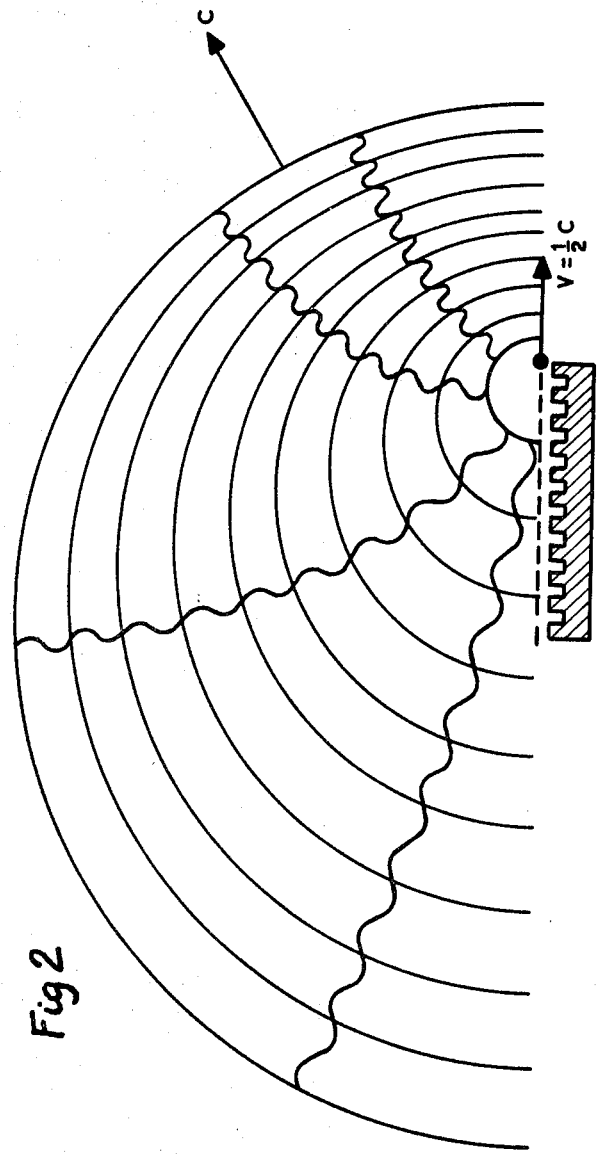
FIGURE 2 illustrates the Doppler effect of a moving dipole.

Since the dipole is moving rapidly along the axis there is a Doppler shift in the observed frequency, illustrated in FIGURE 2 which shows the wave propagation above the grating for $v=\frac{1}{2}c$ to illustrate this effect.

Figure 3:
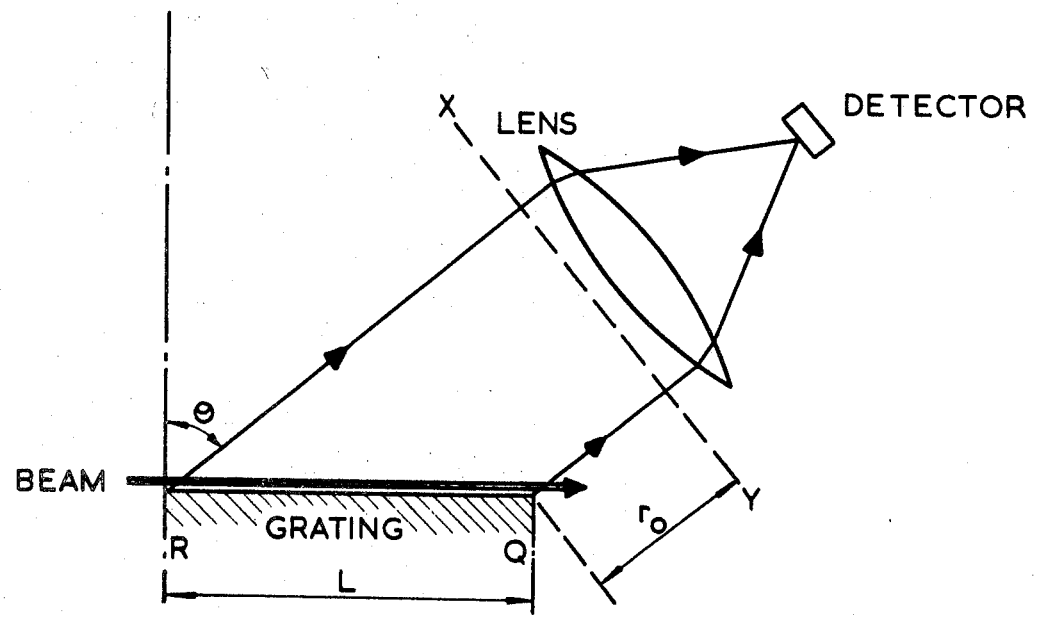
FIGURE 3 illustrates the principle of a radiation-selecting system.

Consider now a detection system, illustrated in FIGURE 3, arranged to select radiation emitted from the grating G at an angle $\theta$ from a plane transverse to the electron beam. To the right of the plane XY all optical path lengths to the detector are equal, so that considering the elapsed time between the start and finish of the light pulse due to one electron we arrive at the following expressions for observable quantities, tabulated in Table I, where $\beta = v/c$.

TABLE I

|  | Grating | Observed |
|---|---|---|
| Frequency | $v/p$ | $p(1-\beta \sin \theta)$ |
| Wavelength | $p$ | $(p/\beta)(1-\beta \sin \theta)$ |
| Pulse duration | $L/v$ | $(L/v)(-\beta \sin \theta)$ |

A more rigorous approach making relativistic transformations of the far-field radiation of a moving Hertzian dipole gives identical results to those derived previously. It is worth noting at this stage that relativistic effects such as the contraction of the grating pitch (as "seen" by the beam electron) cancel out entirely in the equations for observable quantities. From the image charge concept we can also estimate the moment of the fundamental dipole oscillation and using this we arrive at the following expression for the radiated power ($u$) per unit solid angle about $\theta$ due to one electron, during the duration of the radiation pulse $$u = \frac{\mu_0}{c} \left[ 4\pi e d \sin\left(\pi \frac{q}{p}\right) \right]^2 \left[\frac{v}{p}\right]^4 \frac{[\sin \theta - \beta]^2}{[1-\beta \sin \theta]^6}$$

where $\mu_0$ is the permeability of free space and $e$ is the charge of an electron.

The critical dependence of $u$ upon $\theta$ and $\beta$ due to the sixth power in the denominator should be noted. The lobe pattern is shown at (a), (b) and (c) in FIGURE 4 for three values of $\beta$, of zero, 0.3 and 0.5 respectively: the relationship between the grating surface and the angle $\theta$ is illustrated for reference at (d) in FIGURE 4.

The radiated power is zero in the direction $\theta = \sin^{-1} \beta$ but is comparatively large as $v \to c$ for large values of $\theta$.

So far we have only considered a single electron. Now let us consider a finite length of grating and a stream of electrons whose times of arrival at the grating are entirely random, that is to say shot emission. It might at first sight be considered that the random phasing of the light pulses due to individual electrons would produce a white radiation spectrum. This would indeed be true if the duration of the individual light pulses was short compared with the average time interval between the arrival of successive electrons at the grating. However this is not the case here. Campbell's Theorem deals with such a situation where the "effect" due to a single event (the "cause") is known and where the cause is randomly occurring. The result of applying this approach yields the following expressions.

Total Power per unit solid angle about $\theta_0$ due to a Random Beam of Electrons $$dWo/d\Omega = \tfrac{1}{2}\bar{n}T_0 u$$

Shot Noise Power Spectrum $$W(\omega) = \tfrac{1}{4}\bar{n}T_0^2 u \left(\frac{\sin \tfrac{1}{2}(\omega - \omega_0) T_0}{\tfrac{1}{2}(\omega - \omega_0) T_0}\right)^2$$

Shot Noise Linewidth $$d\lambda_N/\lambda_0 \approx 0.89/N$$

where $$T_0 \text{ (the observed pulse duration)} = \frac{L}{v}(1-\beta \sin \theta)$$

$n$ is the average number of electrons emitted per second
$N$ is the total number of grating rulings
$\omega$ is the observed angular frequency $$\omega_0 \text{ is } 2\pi \frac{v}{p} \cdot (1/1-\beta \sin \theta)$$

Campbell's Theorem referred to above is explained in "Mathematical Analysis of Random Noise" by S. O. Rice, Bell System Technical Journal, vol. 23, July 1944, page 282.

We can now insert a few quantities into these equations and see what sort of power output to expect over what bandwidth. At this point is is of interest to make a numerical comparison between an optical and an infrared radiator. To make this comparison as fair and realistic as possible the same electron beam is chosen to operate over two gratings of the same length—the one to produce optical radiation at approximately 5000 A., the other (with much coarser rulings) to produce 50 micron far infrared radiation. The fixed parameters of the beam and the detection systems are the same in each case and are set out in Table II, and the dimensions of the respective gratings are set out in Table III.

TABLE II

| Beam | | |
|---|---|---|
| Potential | kv | 300 |
| Current | ma | 0.1 |
| v | m./s | 2.33×10⁸ |
| β | | 0.776 |
| Detection System | | |
| Focal length | cm | 25 |
| Focal aperture | mm. square | 0.5 |
| $\theta_0$ | ° | 80 |
| $d\Omega$ | steradians | 4×10⁻⁶ | where $d\Omega$ is the solid angle, about $\theta$, within which the detector accepts radiation.

TABLE III

| | Optical | 50μ infrared |
|---|---|---|
| Pitch micron (p) | 1.7 | 165.0 |
| Lines per inch | 15,000 | 154 |
| Groove depth micron (d) | 0.2 | 60.0 |
| Mark/space ratio (q/p) | 0.5 | 0.5 |
| Length, cms. (L) | 6.0 | 6.0 |

Because of the finite aperture of the detector the observed radiation will have a small wavelength spread ($d\lambda_A$) in addition to that caused by the shot noise of the beam ($d\lambda_N$).

Figures for the optical and infrared systems are compared in Table IV.

TABLE IV

| | Optical | Infrared |
|---|---|---|
| $\lambda_0$ | 5,180 A. | 50.0 micron. |
| $W_0$ watt | 5.7×10⁻⁷ | 5.75×10⁻¹⁰. |
| $d\lambda_A$ | 5.9 A. | 0.017 micron. |
| $d\lambda_N$ | 0.13 A. | 0.12 micron. |

In the case of the optical radiator the power output is more than twice as much as that of a black body radiator at 2500° K. over the same wavelength range of 5.9 A.

This optical radiator can easily be modulated in both amplitude and phase up to very high modulation frequencies by the methods usually adopted with electron beams. The variation of wavelength and detected power with viewing angle for this optical radiator is shown in FIGURE 5.

However, the far infrared radiator produces power which is only 25 times greater than thermal radiation over the same wavelength range of 0.12 micron, from objects at room temperature. It is thus unpromising as a useful source of infrared radiation if an ordinary thermionic cathode is used to produce the beam.

Suppose now that the beam electrons arrive over the grating at regular intervals of time $\tau$. If $1/\tau$ is exactly equal to the observed infrared frequency then all the individual light pulses become phase locked and the output power at the frequency $1/\tau$, is considerably increased. Incidentally this implies that the separation of such electrons along the beam axis is exactly equal to the grating pitch. If instead of one electron arriving at regular time intervals there are M electrons then the effective charge of the dipole (and hence the dipole moment) is increased M times and the power per light pulse is M² times greater. This amounts to a delta-modulated electron beam which has very little practical significance. However the sinusoidally modulated beam $$i = i_0(1 + \cos \omega_0 t)$$

is a much more reasonable approximation to reality. Again if M is the number of electrons per cycle then we find that the dipole moment is increased $\gamma M$ times (instead of M times as with the delta modulated beam) where $\gamma \approx \tfrac{1}{2}$. This approximation for the increase in dipole moment is conservative, i.e. $1 \to \gamma \to \tfrac{1}{2}$ rapidly as $1 \to M \to \infty$. For example if $M=10$, $\gamma = 0.512$.

A 100% sinusoidally modulated beam, taking the phase-locked property into account, thus can now be compared with a random beam.

For the random beam we have $$\frac{dW_0}{d\Omega} = \frac{iT_0}{2e} \cdot u$$

giving the variation of $dW_0/d\Omega$ with respect to angle $\theta$ as illustrated at (a) in FIGURE 6.

For the pre-modulated beam we have $$\frac{dW_M}{d\Omega} = \frac{1}{2}\left(\frac{iT_0}{2e} \cdot \frac{\sin N\phi}{N \sin \phi}\right)^2 \cdot u$$

giving the curve illustrated at (b) in FIGURE 6. where $$\phi = \pi\left(\frac{\omega - \omega_0}{\omega_0}\right)$$

Comparing the two systems, modulated and random, we can arrive at the following power ratio $$\frac{\text{Peak modulated}}{\text{Random}} = \frac{iT_0}{4e}\left(\frac{\sin N\phi}{N \sin \phi}\right)^2$$

The width of the main lobe for a premodulated beam can be very small if the number of grating rulings is large ($\Delta\theta \approx 2\pi/N$). It is thus unfair to compare the ratio of the power densities at the peak of this lobe. It is more reasonable to compare the powers over that solid angle which will just encompass the main lobe in the premodulated case. even so a large increase in power, of approximately 40,000 times has been found to be obtainable.

In the embodiment of the invention illustrated in FIGURE 7 a vacuum tube compries a photo-emissive cathode K, electron-beam focusing anodes 1, a grating G and a collector 3 for the electron-beam 2. Beams L1 and L2 of coherent light are combined in a half-silvered mirror M and are focused by a parabolic reflector R1 onto the photocathode K. Radiation from the grating G is collected by a second reflector R2 and focused onto an apertured detector D. Thus R2 and the aperture of the detector form the collimation system which selects the main lobe of radiation.

In this arrangement the two beams of coherent light were obtained from a helium-neon laser having a wavelength of 6328 A. and a ruby laser having a wavelength of 6943 A.: the heat- frequency radiation emitted from the grating had a mean wavelength of 7.144 microns. The system was arranged to detect the main lobe of radiation from the grating, that is to say the lobe having the greatest peak amplitude as illustrated at (b) in FIGURE 6. The observed wavelength change from the first power minimum on one side of the main lobe to the first power minimum on the other side of the main lobe was 0.0056 micron. Thus the observed wavelength over the angle of this main lobe varied from 7.1412 to 7.1468 microns with a mean wavelength at the peak of 7.144 microns. The optical power applied to the apparatus was 4 milliwatts in each laser beam and the detected infrared output at the detector D was 20 milliwatts: it will be realised, from these output and input power figures, that the electron beam serves as an energy source from which at least part of the infrared output energy is derived. The photocathode K used in this embodiment had a quantum efficiency of some 5%, at 6500 A.

Dimensions of the grating used in this arrangement or set up in Table V and can readily be compared with Table III.

TABLE V

| | |
|---|---|
| Pitch, $p$ microns | 23.5 |
| Lines per inch | 1080 |
| Groove depth, $d$ microns | 8.3 |
| Mark/Space ratio, $q/p$ | 0.5 |
| Length, L cms | 6.0 |

It is important that the light sources be correctly aligned so that at the photocathode the wavefronts of the beams L1 and L2 are coincident otherwise some phase cancellation of the beat-frequency component in the electron steam can occur.

In the embodiment of the invention illustrated in FIGURES 8 and 9 an electron tube is formed with a photo-emissive cathode K and focusing anodes A. Light from two laser beams L1 and L2 is directed onto a half-silvered mirror M so as to obtain a single beam which impinges upon the photo-sensitive surface of the cathode K.

Electrons from the cathode K are focused into a thin laminar beam by the anodes 1. The electron beam originates as an amplitude-modulated beam at the difference frequency of the two laser beams. We thus have a bunched laminar electron stream B and this is directed along and parallel to the surface of a metallic diffraction grating G, having grooves perpendicular to the direction of travel of the electrons, and eventually impinges upon a collector 3. The combined laser beam is directed through a window W in the tube in a direction normal to the plane of the window.

The passage of the bunched beam 2 across the surface of the grating G causes an emission of infrared radiation therefrom and this radiation is selected by a suitably-positioned parabolic reflector R and the aperture of a detector D.

The electron optical problems are concerned mainly with converging a photoelectron beam (preferably in one dimension only) while keeping the electron transit time constant for electron trajectories from all parts of the cathode. This is necessary in order to produce spatially coherent electron bunches over the grating.

All of these electron-optical problems are common to both Smith-Purcell grating radiators and to Cerenkov radiators. However, having obtained such a premodulated electron stream, it is far easier to project it across the surface of a metallic grating than close to a dielectric material. The theory outlined here for the grating radiator takes no account of two factors which will now be briefly indicated.

One factor is the distance of the free electron trajectory from the grating surface. The simple image charge estimate of the oscillating dipole moment is independent of this parameter. However we can assume that the beam cannot be separated by much more than the groove depth from the grating surface otherwise the induced surfaces charges will not be sufficiently localised to swing up and down the grooves of the grating. A similar problem exists with the Cerenkov radiator where we think that the separation requirement for a given output may well prove to be more stringent.

The second factor is energy balance—the radiation energy must be obtained from the kinetic energy of the free electrons. By looking at the radition lobe pattern one can see that this will produce two small force components acting on the electron, one component retarding the electron and the other deflecting it into the grating. As $v \rightarrow c$ this latter deflection force becomes small in comparison with the retarding force. The deflection force can however set a limit to the maximum useful length of grating. At high velocities the retarding force will mainly cause a reduction in the effective electron mass and is unlikely to cause a significant frequency shift due to any reduction in electron velocity.

What we claim is:

1. A source of narrow band quasi-coherent electromagnetic radiation comprising an electron discharge tube including a radiation-sensitive electron-emissive cathode, a metallic grating within said tube, and means for forming electrons emitted from said cathode into a beam directed along and parallel to the surface of said grating perpendicular to spatially positioned grooves therein, and means for applying to said cathode two coherent beams of electromagnetic radiation each of a different frequency whereby the electron beam is modulated at the difference frequency of said coherent beams and is spatially coherent and interacts with the grating to produce said quasi-coherent electromagnetic radiation.

2. A source of narrow band quasi-coherent electromagnetic radiation as claimed in claim 1 in which the electron beam is laminar.

3. A source of narrow band quasi-coherent electromagnetic radiation as claimed in claim 2 in which said cathode has a rear surface for receiving said beams of coherent radiation and has a front surface for emitting electrons.

4. A source of narrow band quasi-coherent electromagnetic radiation as claimed in claim 3 in which the coherent beams of radiation are applied to the rear surface of the cathode and the means for applying the coherent beams include a partially reflective member for combining the two beams, and means for directing the combined beams on the rear surface of the cathode.

5. A source of narrow band quasi-coherent electromagnetic radiation as claimed in claim 1 in which the cathod has an electron-emissive surface which emits electrons in response to electromagnetic radiation incident thereon.

6. A source of narrow band quasi-coherent electromagnetic radiation as claimed in claim 5 in which the means for applying the coherent beams includes a partially reflective member for combining the two coherent beams and means for directing the combined beams on the said cathode surface.

7. A source as claimed in claim 1 in which the radiation emitted by interaction of the electron beam and the grating is in the infrared region.

8. A source as claimed in claim 1 including means for selecting a parallel beam of infrared radiation produced by the interaction of the electron beam with the grating, said means including a concave reflecting member having a given focal distance positioned to receive the infrared radiation emitted by said grating, and a member having an aperture therein for the passage of reflected radiation spaced from said reflecting member a distance equal to the said focal distance.

9. A source as claimed in claim 1 including means for selecting a parallel beam of infrared radiation produced by the interaction of the electron beam with the grating, said means including a convex lens positioned in the path of the infrared radiation for focusing said radiation, and a member having an aperture spaced from said lens a distance equal to the focal distance thereof.

References Cited

UNITED STATES PATENTS

| | | | |
|---|---|---|---|
| 2,866,917 | 12/1958 | Salisbury | 331—94.5 X |
| 3,271,573 | 9/1966 | Frost | 250—84 |

ARCHIE R. BORCHELT, *Primary Examiner.*

U.S. Cl. X.R.

250—83.3; 315—4; 331—94.5